United States Patent
Park et al.

(10) Patent No.: US 10,760,713 B2
(45) Date of Patent: Sep. 1, 2020

(54) FLEXIBLE PROTECTOR AND METHOD

(71) Applicants: Do Seo Park, Houston, TX (US); Yuh Loh, Cypress, TX (US); Lorn Rendall, Houston, TX (US); Thomas McClain Scott, Cypress, TX (US)

(72) Inventors: Do Seo Park, Houston, TX (US); Yuh Loh, Cypress, TX (US); Lorn Rendall, Houston, TX (US); Thomas McClain Scott, Cypress, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 16/107,153

(22) Filed: Aug. 21, 2018

(65) Prior Publication Data
US 2019/0093793 A1 Mar. 28, 2019

Related U.S. Application Data

(60) Provisional application No. 62/562,586, filed on Sep. 25, 2017.

(51) Int. Cl.
| | |
|---|---|
| *H01R 13/62* | (2006.01) |
| *F16L 3/137* | (2006.01) |
| *F16L 11/127* | (2006.01) |
| *F16L 3/10* | (2006.01) |
| *H02G 3/04* | (2006.01) |
| *H02G 1/00* | (2006.01) |
| *F16L 57/02* | (2006.01) |
| *F16L 3/12* | (2006.01) |
| *F16L 11/12* | (2006.01) |

(52) U.S. Cl.
CPC ............. *F16L 3/137* (2013.01); *F16L 3/1058* (2013.01); *F16L 11/127* (2013.01); *F16L 57/02* (2013.01); *H02G 1/00* (2013.01); *H02G 3/0481* (2013.01); *F16L 3/1226* (2013.01); *F16L 11/121* (2013.01)

(58) Field of Classification Search
CPC ............ H01R 13/6392; H01R 13/6395; H01R 13/62; H01R 13/6397
USPC ................ 439/369, 367, 368, 371; 174/84 R
See application file for complete search history.

(56) References Cited

U.S. PATENT DOCUMENTS

| | | | | |
|---|---|---|---|---|
| 3,059,209 | A * | 10/1962 | Bird .................... | H01R 13/6392 439/369 |
| 4,643,505 | A * | 2/1987 | House ................. | H01R 13/6392 174/92 |
| 2010/0068913 | A1 * | 3/2010 | Edge ................... | H01R 13/6392 439/369 |

* cited by examiner

*Primary Examiner* — Phuong Chi Thi Nguyen
(74) *Attorney, Agent, or Firm* — Cantor Colburn LLP

(57) ABSTRACT

A flexible protector including a protector housing, clearance space defined by the housing the clearance being dimensioned and positioned to preserve flexibility of the housing while isolating a placed device from bending therein upon flexing of the housing. Also disclosed is a resource recovery system including a spoolable conductor, a device disposed in line with the conductor, and a spoolable protector disposed about the device. A method for protecting a device inline in a spoolable conductor including contacting the device with a buttress of a first half protector, securing conductors in the half protector, and interconnecting a second half protector with the first half protector. A method for instrumenting a target environment.

12 Claims, 5 Drawing Sheets

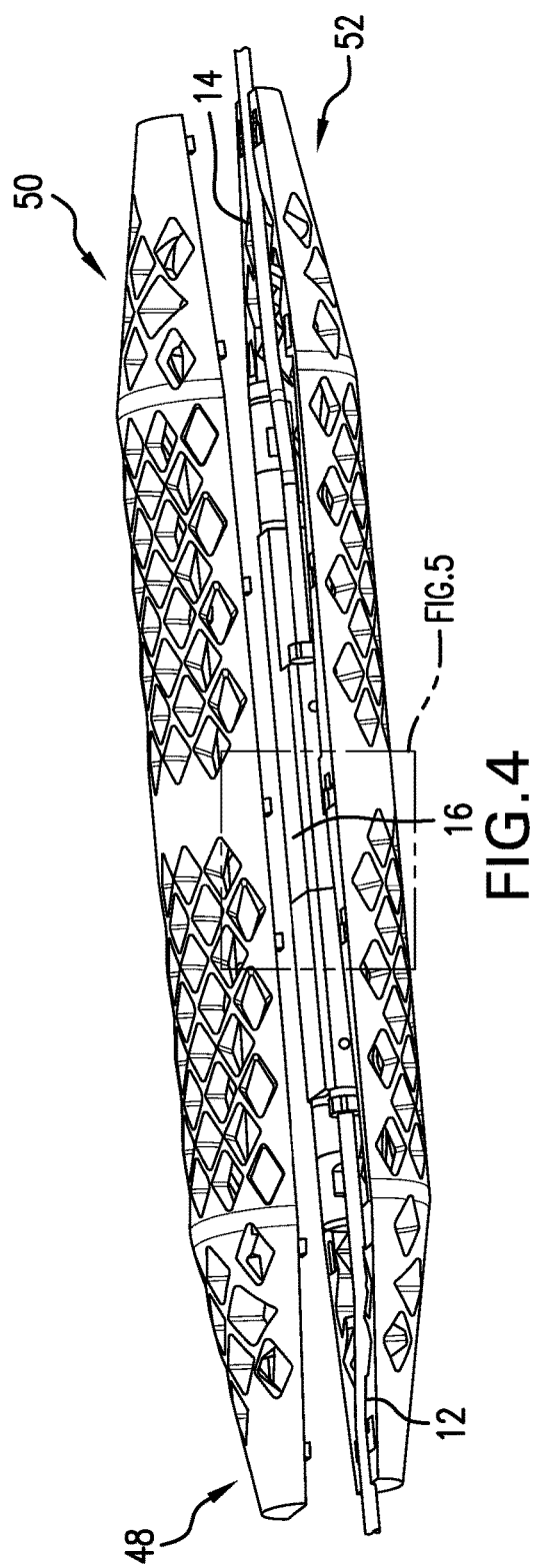
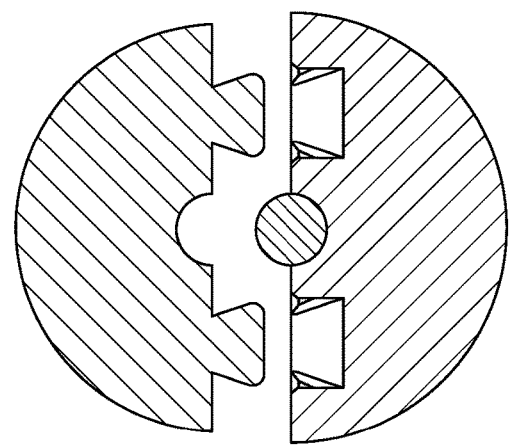
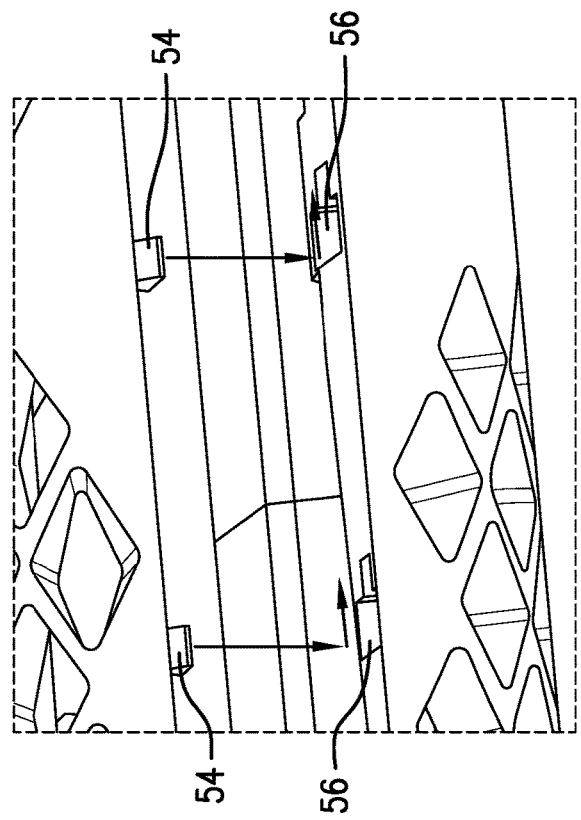

FLEXIBLE PROTECTOR AND METHOD

CROSS REFERENCE TO RELATED APPLICATIONS

This application claims the benefit of an earlier filing date from U.S. Provisional Application Ser. No. 62/562,586 filed Sep. 25, 2017, the entire disclosure of which is incorporated herein by reference.

BACKGROUND

Where long lengths of conduit are employed for various power, communications, monitoring, etc. duties are employed they are normally spooled to manage the conduit and pay it out in an organized manner. In some cases, other devices are disposed in line on the conduit to be spooled out therewith. These include plugs for example that are spaced to be useful to whatever the end utility of the conductor has been planned. In resource recovery industries, there may also be a sheave through which the spooled conduit must be run. This presents even more difficulty as sheaves are often of an even smaller radius than spools and hence require conduits to bend even more to move therethrough.

The concept of spooling devices could be expounded upon except for the radii of the spools, and sheaves in some instances, versus the intolerance to spooling of devices that might be otherwise of interest. The art would welcome advancements that allow other devices to be spooled.

SUMMARY

A flexible protector including a protector housing, clearance space defined by the housing the clearance being dimensioned and positioned to preserve flexibility of the housing while isolating a placed device from bending therein upon flexing of the housing.

A resource recovery system including a spoolable conductor, a device disposed in line with the conductor, and a spoolable protector disposed about the device.

A method for protecting a device inline in a spoolable conductor including contacting the device with a buttress of a first half protector, securing conductors in the half protector, and interconnecting a second half protector with the first half protector.

A method for instrumenting a target environment including contacting a device of a number of devices with a buttress of a first half protector, securing conductors in the half protector; and interconnecting a second half protector with the first half protector to produce a protector; repeating the above for a number of devices to form an elongated conductor with a number of devices and protectors inline, spooling the elongated conductor with a number of devices and protectors inline onto a spool, running the elongated conductor with a number of devices and protectors inline into a target environment while protecting the devices from bending moments.

BRIEF DESCRIPTION OF THE DRAWINGS

The following descriptions should not be considered limiting in any way. With reference to the accompanying drawings, like elements are numbered alike:

FIG. 4 is an exploded view of a flexible protector illustrating an interconnection configuration;

FIG. 5 is an enlarged view of a portion of FIG. 4 illustrating the dovetail interconnection configuration;

FIG. 6 is a cross sectional view of the embodiment of FIG. 5 through the dovetails.

DETAILED DESCRIPTION

A detailed description of one or more embodiments of the disclosed apparatus and method are presented herein by way of exemplification and not limitation with reference to the Figures.

Figure 1:
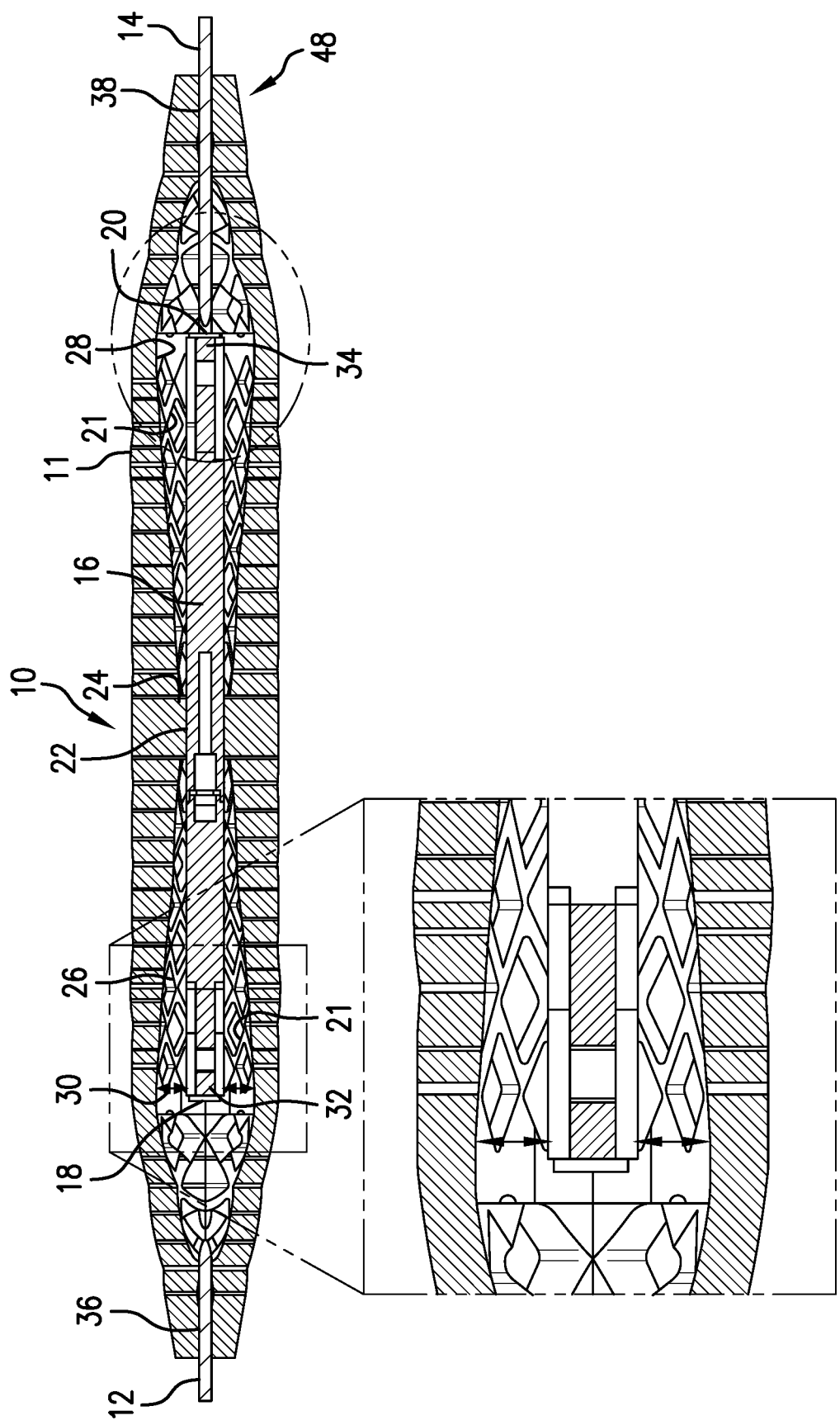
FIG. 1 is a longitudinal cross sectional view of an embodiment of a flexible protector.

Referring to FIG. 1, a flexible protector 10 comprising a housing 11 is illustrated with lines 12 and 14 extending from each end thereof. The lines are to be understood to represent a conductor or multiple conductors encapsulated together, known as a flatpack, that is to be spooled onto a spool not shown and may comprise electrical conductor, a fiber optic cable, a hydraulic line, and any combination including at least one of the foregoing etc. The conductors 12 and 14 are attached to a device 16 (or instrument), which may be a gauge, sensor, filter, or other device, for example. Where such devices 16 are longer, for example more than a couple of inches in length and relatively rigid, meaning they do not readily bend to the spool radius they will cause difficulty at the connection point with conductors 12 and 14 at least and may additionally be internally damaged by bending. In an example, a device that is relatively rigid and ten inches in length can easily be damaged by forcible bending to the radius of a spool and if it is not damaged, will certainly cause an angle with the conductors 12 and 14 at their respective connection points with the device 16. The connection points have been labeled 18 and 20 respectively for clarity. Angles at the connection points 18 and 20 are deleterious to longevity at best. Accordingly, the protector 10 is of a flexible material whose flexibility will allow the protector 10 to bend to a degree that maintains the device 16 unbent and yet allows for a smoother transition of the connection points 18 and 20 to the conductors 12 and 14. One range of flexibility of the protector 10 is one to five inches of deflection over its length. It will be understood however that the point is to allow the device 16 to remain unbent while smoothly transitioning the conductors 12 and 14. It will further be understood that the diameter of the spool the conductor will be disposed upon is relevant as is the length of the device 16. The shorter the device 16 is, the less bending that is necessary for the protector 10. The longer the device 16 is however, the more bending will be required of the protector 10 (in similar diameter spools for the example). While the protector 10 is illustrated with diamond shaped openings 21 therein, this is but one possibility. Other shapes may be utilized or the protector may employ a solid wall instead as desired. Depending upon what construction is selected materials and or thickness of the protector may be adjusted to achieve the amount of flexibility desired for a particular iteration.

Figure 2:
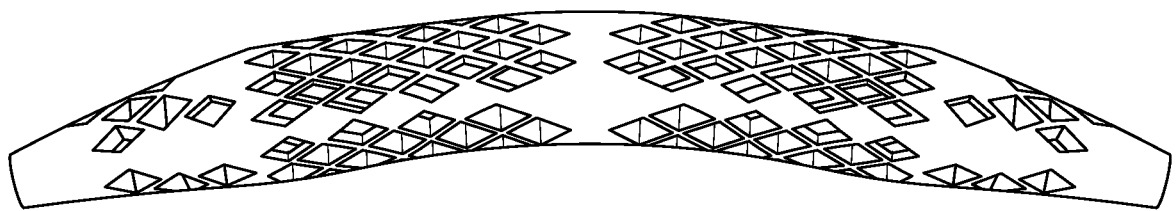
FIG. 2 is a view of the protector of FIG. 1 (or of FIG. 3) in a flexed position.

Still referring to FIG. 1, the degree of flexibility may be ascertained by example. The device 16 is contacted at its center point 22 by buttress 24 of the protector 10. From there and moving outwardly in both directions, it will be appreciated that the interior space is defined by a frustoconically diverging wall 26 on one side and wall 28 on the other. The diverging walls provide for a larger clearance space 30 at ends of the device 16. It will be appreciated then that if the protector is flexed along its length into a curve (see FIG. 2), the ends 32 and 34 of device 16 will have the extent of that clearance 30 before contacting the walls 26 and 28 of the protector 10 and hence avoid any bending moment on the device 16 prior to such contact with the walls 26 and 28. The greatest dimension needed for the clearance space 30 is of course at the ends of the device since the curvature of the protector housing 11 means that the further from buttress 24 the higher the degree of deviation of the device 16 from a now curving centerline of the housing 11. This is the reason the frustoconical shape is functional. If the flexibility of the protector 10 is properly selected for the diameter of the spool, the length of the device 16 and the tension that will be placed upon the conductors 12 and 14, the device 16 will not experience a bending moment beyond its capability of handling. This may be zero in some instances but may be some in other instances. Flexibility of the protector 10 then is selectable based upon the particular parameters of the system with which one is working.

In addition to flexibility, another parameter of interest for the protector 10 is its overall length relative to the device 16 to be housed therein. The length of protector 16 relative to device 16 dictates how far from connection points 18 and 20 the conductors 12 and 14 will be secured to the protector 10. Securements 36 and 38 are needed to ensure the protector 10 does not slide on the conductors 12 and 14. Securements 36 and 38 may be compression fits or any other strain relief type connection that will be familiar to one of ordinary skill in the art. The farther the securements 36 and 38 are from the connection points 18 and 20, the lesser the angle created at connection points 18 and 20 when the protector 10 is put in bending. A desirable distance between the connection points 18 and 20 and respective securements 36 and 38 is at least 6" of straight conductor.

Figure 3:
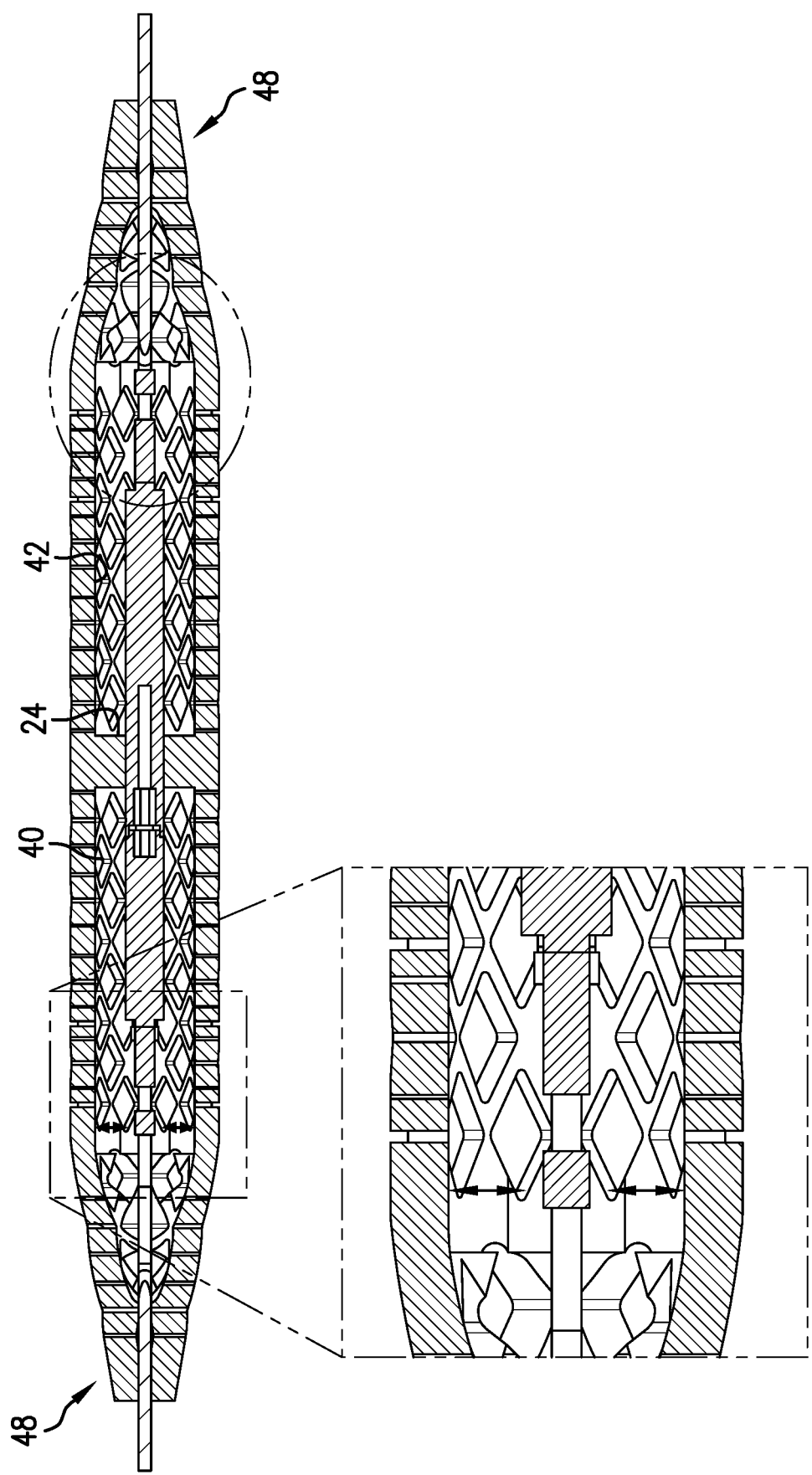
FIG. 3 is a longitudinal cross sectional view of another embodiment of a flexible protector.

Referring to FIG. 3, another embodiment does not use the frustoconical walls 26 and 28 but rather employs a cylindrical shape with walls 40 and 42 disposed upon either side of the buttress 24, which remains substantially the same in configuration and function from the embodiment of FIG. 1. The cylindrical shape has an identical function as the embodiment of FIG. 1 but may be more easily manufactured in a traditional subtractive method. Either embodiment is easily created using an additive manufacturing method. Materials for the protector include molded rubber, other polymeric materials such as Poly Ether Ether Ketone (PEEK), Nylon, etc.

Figure 7:
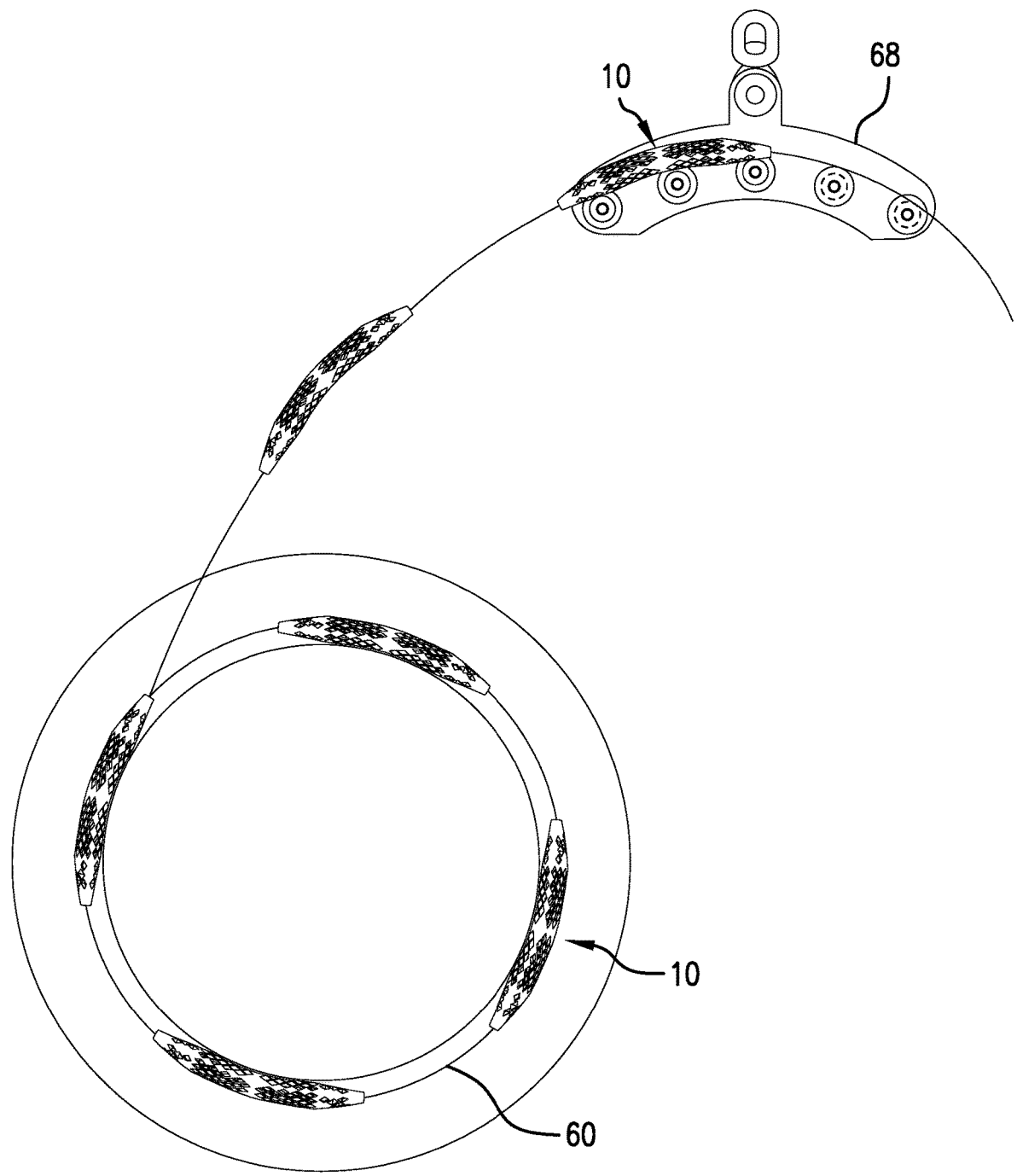
FIG. 7 is a view of a number of protectors on a coil and being fed through a sheave.

It will be appreciated that one or both ends 48 of the housing 11 may be configured with diminishing dimensions such as a frustocone, ogive, etc. to help with its passage through other configurations and pathways such as sheaves, tubulars, etc. An illustration of the protector 10 on a coil and running through a sheave 68 is provided in FIG. 7.

Referring to FIGS. 4-6, an iteration of assembly of the protector 10 is illustrated. In this iteration, the protector 10 is created in two halves, 50 and 52 that are disposed about a device 16 and the conductors 12 and 14. It will be appreciated from FIG. 5 that interconnectors such as dovetails 54 are inserted into dovetail receptacles 56 and slid sideways to lock therein in accordance with the arrows shown on the Figure. FIG. 6 provides another view of the dovetails and receptacles. It is to be understood that alternate interconnectors are contemplated including but not limited to one or more swing bolts (w/position pins), rubber latches (w/position pins), detents, etc.

In use, the protector 10 is placed about a device 16 already spliced into the conductors 12, 14. The device 16 is placed into supportive contact with the buttress 24 and the conductors 12 and 14 are placed into the respective securements 36 and 38 of one half 52 of the protector 10. The other half 50 of the protector 10 is then attached to the side 52 through one of the interconnector arrangements disclosed. This process is repeated as many times as required for a particular system with devices being spaced along the conductor length and protectors being placed about those devices 16. The prepared conductor 60 is spooled and then fed into whatever duty it is to be given (see FIG. 7). If on a rig for resource recovery, that duty may be to run through a sheave 68 and into a borehole to provide what connectivity and sensory response it is designed to provide from the downhole environment.

The protector 10 may be used to protect a device 16 from bending moments during spooling and deployment in a target environment such as, for example, a borehole or other elongated structure requiring instrumentation.

Set forth below are some embodiments of the foregoing disclosure:

Embodiment 1: A flexible protector including a protector housing, a clearance space defined by the housing the clearance space being dimensioned and positioned to preserve flexibility of the housing while isolating a placed device from bending therein upon flexing of the housing.

Embodiment 2: The protector as in any prior embodiment wherein the clearance space is of frustoconical shape.

Embodiment 3: The protector as in any prior embodiment wherein the clearance space is of cylindrical shape.

Embodiment 4: The protector as in any prior embodiment wherein the housing has a multiplicity of openings in walls thereof.

Embodiment 5: The protector as in any prior embodiment wherein the housing further includes ends of diminishing dimensions.

Embodiment 6: The protector as in any prior embodiment wherein the housing comprises one or more of soft metal and polymers.

Embodiment 7: The protector as in any prior embodiment further including a buttress extending inwardly from the housing and configured to contact a device to be placed within the housing.

Embodiment 8: The protector as in any prior embodiment wherein the housing includes a securement.

Embodiment 9: A resource recovery system including a spoolable conductor, a device disposed in line with the conductor, and a spoolable protector disposed about the device.

Embodiment 10: A method for protecting a device inline in a spoolable conductor including contacting the device with a buttress of a first half protector, securing conductors in the half protector, and interconnecting a second half protector with the first half protector.

Embodiment 11: A method for instrumenting a target environment including contacting a device of a number of devices with a buttress of a first half protector, securing conductors in the half protector, and interconnecting a second half protector with the first half protector to produce a protector, repeating the above for a number of devices to form an elongated conductor with a number of devices and protectors inline, spooling the elongated conductor with a number of devices and protectors inline onto a spool, running the elongated conductor with a number of device and protectors inline into a target environment while protecting the devices from bending moments.

Embodiment 12: The method as in any prior embodiment wherein the running includes running through intermediate equipment.

Embodiment 13: A method for preparing an instrumentation spool including contacting a device of a number of devices with a buttress of a first half protector, securing conductors in the half protector, and interconnecting a second half protector with the first half protector to produce a protector, repeating the above for a number of devices to form an elongated conductor with a number of devices and protectors inline, spooling the elongated conductor with a number of devices and protectors inline onto a spool.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A flexible protector comprising:
   a protector housing;
   a clearance space defined by the housing the clearance space being dimensioned and positioned to preserve flexibility of the housing while isolating a device placed therein during use from bending upon flexing of the housing, the clearance space extending within the housing along a longitudinal extent of the housing, the clearance space comprising two relatively larger dimensions portions and a relatively smaller dimensions portion that is located between the two relatively larger dimensions portions, the two relatively larger dimensions portions becoming progressively larger with increasing distance in opposing directions from the relatively smaller dimensions portion such that the device when placed in the housing during use is supported by the housing at the relatively smaller dimensions portion of the clearance space and opposing ends of the device are free to move in the relatively larger dimensions portions of the clearance space relative to the housing.

2. The protector as claimed in claim 1 wherein the clearance space is of frustoconical shape.

3. The protector as claimed in claim 1 wherein the clearance space is of cylindrical shape.

4. The protector as claimed in claim 1 wherein the housing has a multiplicity of openings in walls thereof.

5. The protector as claimed in claim 1 wherein the housing further includes ends of diminishing dimensions.

6. The protector as claimed in claim 1 wherein the housing comprises one or more of soft metal and polymers.

7. The protector as claimed in claim 1 further including a buttress extending inwardly from the housing and configured to contact a device to be placed within the housing.

8. The protector as claimed in claim 1 wherein the housing includes a securement.

9. A resource recovery system comprising:
   a spoolable conductor;
   a device disposed in line with the conductor; and
   a spoolable protector disposed about the device, the protector including a protector housing;
   a clearance space defined by the housing the clearance space being dimensioned and positioned to preserve flexibility of the housing while isolating a device placed therein during use from bending upon flexing of the housing, the clearance space extending within the housing along a longitudinal extent of the housing, the clearance space comprising two relatively larger dimensions portions and a relatively smaller dimensions portion that is located between the two relatively larger dimensions portions, the two relatively larger dimensions portions becoming progressively larger with increasing distance in opposing directions from the relatively smaller dimensions portion such that the device when placed in the housing during use is supported by the housing at the relatively smaller dimensions portion of the clearance space and opposing ends of the device are free to move in the relatively larger dimensions portions of the clearance space relative to the housing.

10. A method for protecting a device inline in a spoolable conductor comprising:
    contacting the device with a buttress of a first half protector, the first half protector defining a clearance space, the clearance space extending within the housing along a longitudinal extent of the housing, the clearance space comprising two relatively larger dimensions portions and a relatively smaller dimensions portion that is located between the two relatively larger dimensions portions and in line with the buttress, the two relatively larger dimensions portions becoming progressively larger with increasing distance in opposing directions from the relatively smaller dimensions portion;

securing conductors in the half protector; and interconnecting a second half protector with the first half protector.

11. A method for instrumenting a target environment comprising:

contacting a device of a number of devices with a buttress of a first half protector, the first half protector defining a clearance, the clearance space extending within the housing along a longitudinal extent of the housing, the clearance space comprising two relatively larger dimensions portions and a relatively smaller dimensions portion that is located between the two relatively larger dimensions portions and in line with the buttress, the two relatively larger dimensions portions becoming progressively larger with increasing distance in opposing directions from the relatively smaller dimensions portion;

securing conductors in the half protector; and interconnecting a second half protector with the first half protector to produce a protector;

repeating the above for a number of devices to form an elongated conductor with a number of devices and protectors inline;

spooling the elongated conductor with a number of devices and protectors inline onto a spool;

running the elongated conductor with a number of devices and protectors inline into a target environment while protecting the devices from bending moments.

12. The method as claimed in claim 11 wherein the running includes running through intermediate equipment.

* * * * *